April 13, 1926.
W. W. SLACK
1,580,174
PATTERN REPRODUCING MACHINE
Filed Sept. 1, 1925
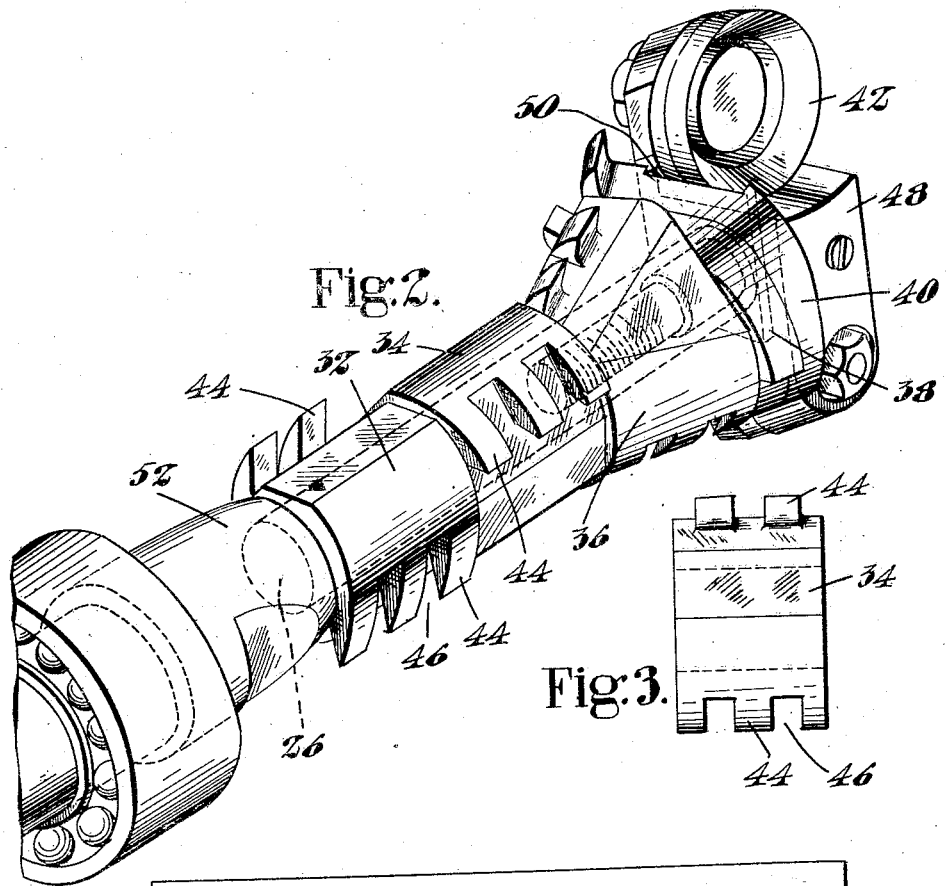
Fig. 2.
Fig. 3.
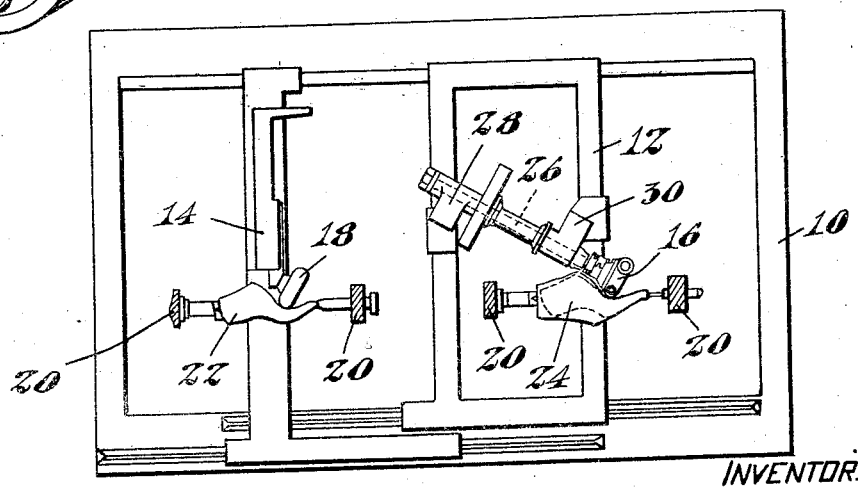
Fig. 1.
INVENTOR.
Walter W. Slack
By his Attorney,
Nelson W. Howard Patented Apr. 13, 1926.

1,580,174

UNITED STATES PATENT OFFICE.

WALTER W. SLACK, OF SPRINGFIELD, VERMONT, ASSIGNOR TO FITZ-EMPIRE DOUBLE PIVOT LAST COMPANY, OF AUBURN, MAINE, A CORPORATION OF MAINE.

PATTERN-REPRODUCING MACHINE.

Application filed September 1, 1925. Serial No. 53,819.

*To all whom it may concern:*

Be it known that I, WALTER W. SLACK, a citizen of the United States, residing at Springfield, in the county of Windsor and State of Vermont, have invented certain Improvements in Pattern-Reproducing Machines, of which the following description, in connection with the accompanying drawings, is a specification, like reference characters on the drawings indicating like parts in the several figures.

This invention relates to pattern reproducing machines and is disclosed as embodied in a lathe for turning lasts.

In the ordinary last lathe, a moving frame holding the model and a last block from which a last is to be turned moves toward and from a model wheel and a cutter head. The model always rests against the model wheel, thus controlling the depth of cut in the work, and the model and work are rotated at the same speed in the frame to carry the points of contact around the model and work, respectively.

Cutter heads of the type generally used in the production of high-grade lasts, known as "small" cutter heads, have a relatively small effective diameter, commonly about 3½ inches, so that they can reproduce accurately sharp concavities in the model. The last lathe small cutter head which has been most successful in commercial use is of the type disclosed in United States Letters Patent No. 1,330,841, granted Feb. 17, 1920, on the application of F. S. Buck. Such a cutter head consists of a pair of finishing cutters, of cup shape, corresponding to the model wheel contour, which are preceded along the work by a number of roughing cutters of very rugged construction arranged to trim the block down a little deeper as each one comes along until only a light cut is left for the finishing cutters. These roughing cutters are about 1¼ inches thick measured along the cutter shaft and have substantially straight uninterrupted cutting edges of about that length, one on each side of the shaft.

There is so much wood to be removed from a last block in turning a last and the duty on the cutter head is so great that even in using a cutter head of the Buck type it has generally been the custom to trim the block by hand on a circular saw before putting it in the machine. This trimming operation is dangerous and is necessarily a rough one so that many half-turned blocks have to be thrown away because they have been trimmed a little too much, which results in expensive production. Furthermore, the duty required of the cutters heretofore known, even on a trimmed block, is often heavy.

In view of the foregoing, it is an object of the present invention to increase the efficiency of last lathe cutter heads and in particular still further to improve cutter heads of the type described, so that, while retaining all the advantages which have made such cutter heads so successful, much less or, in many cases, no preliminary block trimming will be necessary, with consequent avoidance of danger to the trimmer, trimming expense and block waste.

In solving this problem I have found that it is easier for the machine to cut smoothly a large number of shorter, thicker chips than a smaller number of thinner, longer ones, and I have secured markedly greater cutter head efficiency by dividing the roughing cutter edges into a series of spaced teeth, the teeth on each edge of each cutter overlapping the spaces between the teeth on the other edge. Thus the edge of a roughing cutter engages the work along a total of about half of its own length, leaving a series of ridges between its teeth, which are cut out by the teeth of the other edge. Thus the teeth cut a chip about twice as thick as a continuous-edged cutter would.

Accordingly, a principal feature of my invention consists in the last lathe comprising a cutter head organization having roughing cutters and finishing cutters positioned in succession along a shaft, arranged to treat the same locality on the work in succession, each roughing cutter having two oppositely placed cutting edges formed with spaced teeth, the teeth of each edge overlapping the spaces between the teeth of the other, and the edges of the different cutters being staggered around the shaft.

These and other features of the invention, including certain details of construction and combinations of parts, will be understood from the following description taken in connection with the accompanying drawings in which, Fig. 1 is a plan view of the essential parts of the machine;

Fig. 2 is an enlarged view of the cutter head; and

Fig. 3 is a detail of one of the roughing cutters.

The bed 10 of the illustrated machine carries two sliding carriages 12 and 14, which carry the cutter head 16 and model wheel 18, respectively. The swing frame 20 carries and rotates the model 22 and block 24 opposite the model wheel and cutter head, respectively. It swings in toward them by gravity and the contact of the model wheel and model controls the depth of cut in the block. The carriages 12 and 14 are traversed along the bed to carry the model wheel and cutter head longitudinally past the model and work block as the cutting proceeds. Reference may be had to the Letters Patent referred to for a fuller description of the general organization of the machine.

The illustrated cutter head is carried on a shaft 26 mounted suitably in bearings 28, 30 on the carriage 12, and driven in any convenient way as by the illustrated pulley, or by a motor. The shaft is arranged at an angle of about 30° to the axis of the work, as shown and explained in the Letters Patent referred to. The end projecting toward the work carries the cutter head 16. This consists, in the illustrated form, of five roughing cutters 32, 34, 36, 38, and 40, and a pair of finishing cup cutters 42, which latter effectively correspond in shape and size with the contour of the model wheel 18. The first three roughing cutters, as illustrated, are about 1¼ inches thick measured along the shaft, and each has two oppositely disposed cutting edges formed with spaced teeth 44. As shown, the teeth 44 of each cutting edge overlap the spaces 46 between the teeth of the other and are a little wider than the spaces. The cutting edges of these successive cutters are also staggered around the shaft in a broken spiral so that they will not all engage the work piece or block 24 simultaneously. In the illustrated cutter head, the cutters 32 and 34 are alike, and effectively cylindrical in contour, while the cutter 36 is conical and flares out toward the end of the cutter head. The last illustrated two roughing cutters 38, 40 are about $\frac{5}{32}$ inch thick and continue the conical flare toward the finishing cutters. Their cutting edges are continuous as shown, and are staggered around the shaft so as to alternate with other cutting edges in cutting the work.

The finishing cup cutters 42 are mounted on a head 48 which screws into the end of the shaft 26, and there is preferably provided a boss and slot construction 50 between the cutter 40 and the head 48 to preserve the relative arrangement of the cutters 40 and 42. I have found that the cutter 38 is firmly held in position by friction, but the cutters 32, 34, 36 are preferably splined. The screwing up of the head 48 clamps them all against a shoulder 52 on the shaft 26.

The general effective shape of the cutter head is that of a pear with the large end extending toward the work, and effective in performing the finishing cut. The advantages of this construction are explained in the Letters Patent referred to.

The construction described above cuts freely, with minimum jar vibration, and considerably less rough-block trimming is required for the blanks it cuts than under the prior practice. In many cases no trimming at all is required. Thus the loss of many blocks is avoided and danger to the trimming operator is reduced.

Having described my invention, what I claim as new and desire to secure by Letters Patent of the United States is:—

1. A last lathe cutter head comprising a shaft having mounted thereon a plurality of roughing cutters and a finishing cutter, the roughing cutters each having two oppositely disposed cutting edges divided into spaced teeth, the width of the teeth being greater than the width of the spaces, the teeth on each edge of a given cutter overlapping the spaces between the teeth of the other edge, and the cutting edges of the successive roughing cutters being staggered around the shaft to avoid simultaneous engagement with the work.

2. A last lathe having a moving frame arranged to carry and rotate a model and a block, a model wheel and a cutter head arranged to be traversed parallel to the axes of the model and block respectively, the cutter head axis being arranged at an acute angle to the direction of traverse of the cutter head, the cutter head projecting toward the block from the end of the shaft and being effectively pear-shaped in contour, and a series of roughing cutters and a terminal finishing cutter on the cutter head, each roughing cutter having two oppositely disposed cutting edges divided into spaced teeth, the width of the teeth being greater than the width of the spaces, the teeth on each edge of a given cutter overlapping the spaces between the teeth of the other edge, and the cutting edges of the successive roughing cutters being staggered around the shaft to avoid simultaneous engagement with the work.

In testimony whereof I have signed my name to this specification.

WALTER W. SLACK.